United States Patent
Lin et al.

(10) Patent No.: US 7,466,570 B2
(45) Date of Patent: Dec. 16, 2008

(54) ISLANDING DETECTION METHOD

(75) Inventors: Pao-Chuan Lin, Chu Pei (TW);
Yung-Fu Huang, Ping Tung (TW);
Tain-Syh Luor, Chungho (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 391 days.

(21) Appl. No.: 11/312,395

(22) Filed: Dec. 21, 2005

(65) Prior Publication Data

US 2006/0146582 A1    Jul. 6, 2006

(30) Foreign Application Priority Data

Dec. 31, 2004   (TW) .............................. 93141907 A

(51) Int. Cl.
*H02J 1/02* (2006.01)
(52) U.S. Cl. ........................................................ 363/39
(58) Field of Classification Search .................. 363/39, 363/40, 50, 55; 361/18, 20, 21, 62–66, 78, 361/85
See application file for complete search history.

(56) References Cited

U.S. PATENT DOCUMENTS

| | | | |
|---|---|---|---|
| 5,111,377 A | 5/1992 | Higasa et al. | |
| 5,493,485 A | 2/1996 | Okado | |
| 5,925,093 A * | 7/1999 | Yasuda | 708/313 |
| 6,172,889 B1 * | 1/2001 | Eguchi et al. | 363/95 |
| 6,429,546 B1 | 8/2002 | Ropp et al. | |
| 6,801,442 B2 * | 10/2004 | Suzui et al. | 363/55 |
| 6,864,595 B2 * | 3/2005 | Wall | 290/52 |
| 7,106,564 B2 * | 9/2006 | Deng et al. | 361/62 |
| 7,116,144 B1 * | 10/2006 | Cheng | 327/156 |

FOREIGN PATENT DOCUMENTS

JP     2002-500496    1/2002

* cited by examiner

*Primary Examiner*—Matthew V Nguyen
(74) *Attorney, Agent, or Firm*—Rabin & Berdo, P.C.

(57) ABSTRACT

An islanding detection method is proposed to overcome the incapability of detecting islanding operations in accordance with prior arts. A distortion for causing a variation of an AC power system is performed, and an AC power system frequency and a voltage variation are detected as the bases for determining the occurrence of an islanding operation.

15 Claims, 3 Drawing Sheets

ISLANDING DETECTION METHOD

BACKGROUND OF THE INVENTION

1. Field of the Invention

The present invention relates to an islanding detection method, and more particularly to a detection method that prevents an occurrence of an islanding operation.

2. Description of Related Art

Distributed energy or renewable AC power generating equipment is often operated parallel with AC power system. If the AC power system breaks down due to abnormality and the distributed energy AC power generating equipment cannot detect the abnormal breakdown of the AC power system remain continues supplying power, then an independent power supplying condition occurs. During the independent power supplying period, both the voltage and frequency are unstable, so that other electric appliances or equipments may be damaged easily. In addition, accidents or electric shock may occur due to the negligence of maintenance people in related regions, or the AC power system cannot be synchronized during a power recovery, thus damaging the related equipment.

If the voltage and frequency of the AC power system at the point of common coupling (PCC) are detected and the voltage or frequency goes beyond (either higher or lower than) the operating range, then the distributed power system will be disconnected to avoid the occurrence of an islanding operation. Alternatively, the voltage phase of the power system is detected all the time, and a substantial voltage phase jump indicates the occurrence of an islanding operation. The foregoing voltage, frequency, phase jump methods are usually limited by the form of a load, and sometimes the occurrence of an islanding operation cannot be detected due to the conditions of the load. Such an undetectable zone is known as a non-detection zone (NDZ).

Another technology is to detect the total harmonic distortion (THD) of the power distribution at the point of common coupling (PCC). Distortion exceeding a predetermined standard indicates the occurrence of an islanding operation phenomenon. The exciting current of a transformer varies non-linearly according to the theory of the non-linear B-H curve of the transformer. If a power system operates normally, the non-linear current is supplied by the power system, and thus will not affect the harmonic of voltage, but if the power system breaks down, such non-linear current must be supplied by the distributed power system. At that point, harmonics of voltage appear, and thus the harmonic of voltage can be used for determining an islanding operation. Further, the principle of the direct communication method by using power line carrier is clear and obvious, but it is necessary to install expensive communication equipments on both sides. The foregoing methods are generally referred to as passive islanding detection methods.

Another important detection method is categorized as an active islanding detection-method. U.S. Pat. No. 5,493,485 discloses a way of determining the phase shift between output current and voltage using a factor such as the phase between current and voltage, a frequency of voltage change, an amplitude of voltage change, or a change of total harmonic distortion (THD) of voltage. Such a method is very complicated and difficult to implement into actual practice. So that when a change of frequency of voltage is detected, the phase angle between current and voltage is adjusted to make the operation point to reach another stable point according to the curve. The stable point falls beyond the normal operating zone, and such a curve is shown in FIG. 2.

U.S. Pat. No. 5,111,377 uses a current frequency of a disturbance input power system, and such disturbance has no significant effect upon the voltage frequency when a power system is operating normally. If the power system breaks down, the disturbance will directly affect the voltage frequency and/or the phase difference of the current. When there is a phase difference or a frequency change, the variation will be positively fed back to the disturbance of the current frequency, so that the disturbance is increased again until the voltage frequency exceeds the operating range, so as to detect an islanding operation phenomenon. U.S. Pat. No. 6,172,889 also has similar system architecture.

The method adopting a disturbance input power system also has NDZ as disclosed in U.S. Pat. No. 6,429,546. In other words, when a load is specific, or a phase shift produced by a low-pass filter precisely offsets the original target variation, the voltage or phase change cannot be detected, and thus the islanding operation phenomenon cannot be detected, either. U.S. Pat. No. 6,429,546 uses a polynomial or a forgetting function to give weights to the variation, but such method is complicated and not easy to implement into actual practice. Many of the aforementioned methods use a positive feedback method to adjust the frequency of the voltage or the current, or the phase angle between voltage and current of renewable generation system, and the adjustment is determined mainly by an error. The smaller the error is, the less the adjustment, and the larger the detection time. If an error approaches or equals zero due to a circuit/load delay (lead), then the islanding operation status cannot be detected.

SUMMARY OF THE INVENTION

A primary objective of the present invention is to adjust an error to an error differential vector S and a counter Ws. The counter is mapped into a function for determining the adjustment, so as to avoid a reduction of adjustment due to a decreased feedback error.

The present invention proposes an islanding detection method to avoid the occurrence of an islanding operation, which comprises the steps of detecting a plurality of voltage frequencies of a point of common coupling (PCC); comparing the difference between these voltage frequencies; producing an function from the difference obtained after the comparison; and determining an adjustment according to the function.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

The present invention is illustrated with a preferred embodiment and attached drawings. However, the invention is not intended to be limited thereby.

Figure 1:
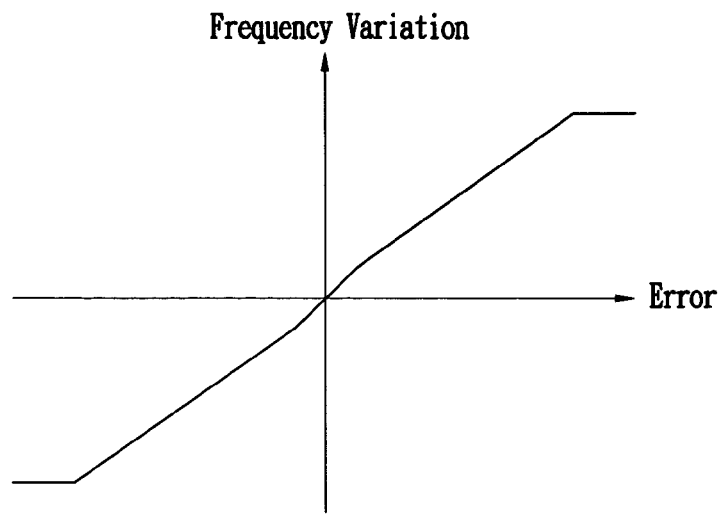
FIG. 1 is a graph of adjusting an increase or a decrease of a frequency difference according to a prior art.
Figure 2:
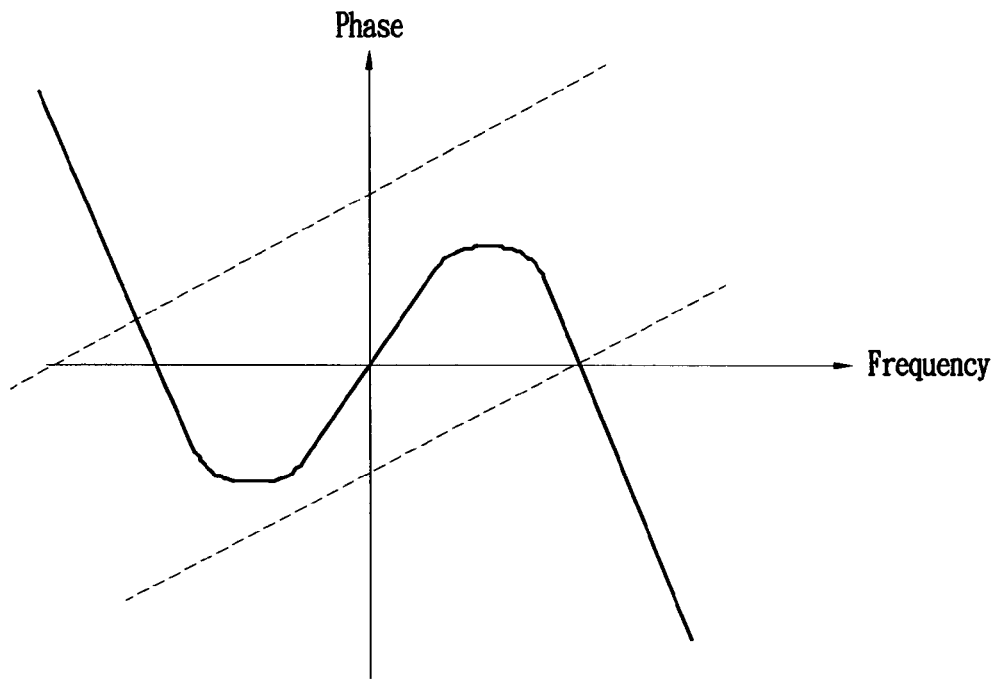
FIG. 2 is a graph of a shift difference model according a prior art.
Figure 3:
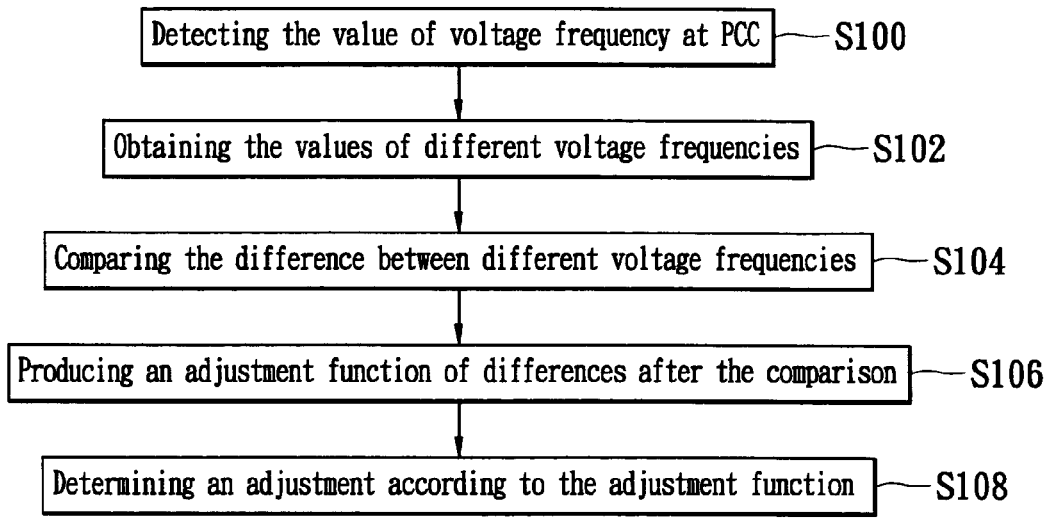
FIG. 3 is a flow chart of an islanding detection method of the present invention.

Referring to FIG. 3, a flow chart of an islanding detection method of the present invention is shown. In Step (S100), a device is used to detect a plurality of voltage frequencies of a point of common coupling (PCC) to avoid the occurrence of an islanding operation. In Step (S102), although a voltage frequency remains unchanged when a power system is operating normally, a plurality of different voltage frequency can be obtained if such device is used for detecting the voltage frequency. In step (S104), the differences among the foregoing different voltage frequency are compared. In Step (S106), a function is produced from the difference after the comparison. In Step (S108), an adjustment is determined according to the function. If the difference of voltage frequency is very small, a small current output frequency or phase change will be added, and the polarity of such change will be the same as the voltage frequency difference. The value of a current output frequency can be calculated by $fI_k = fV_{fk} + S \times \Delta f_0$, where $fI_k$ is a predetermined output current frequency at the $K^{th}$ sampling cycle, $fV_k$ is a voltage frequency detected at the $K^{th}$ sampling cycle, $\Delta f_0$ is a small current frequency variation, and S is an error differential vector. The condition for the error differential vector to be zero if $fV_K - fV_{k-1} = 0$; the error differential vector equals to 1 if $fV_K - fV_{K-1} > 0$; and the value of the error differential vector to $-1$ if $fV_K - fV_{K-1} < 0$, where $fV_k$ is a voltage frequency detected at the $K^{th}$ sampling cycle and $fV_{k-1}$ is a voltage frequency detected at the $K-1^{th}$ sampling cycle.

In general, the voltage frequency of a power system usually keeps constant. Even if there is a vibration, such vibration takes place very slowly and is very small. Therefore, the voltage frequency is calculated once for each cycle by an infinite impulse response (IIR) filter, such as the equation $fV_{fk} = (1-x)fV_{fk-1} + x \cdot fV_k$, where $fV_{fk}$ is the currently obtained voltage frequency, and x is a time constant of the filter. For convenience, the calculation can be designed as a multiple of 2 to the $-n^{th}$ power series. Since the resolution of the voltage frequency detection is more accurate, such a small change in current frequency is insignificant to the total harmonic distortion of the output current.

When a power system breaks down, the detected voltage frequency totally depends on the load at that moment. If the detected voltage frequency variation is relatively large, the current frequency or the phase disturbance is increased to expedite the change of the voltage frequency. The current frequency or phase shift is determined by $fI_k = fV_{fk} + S \times \Delta f_1$ where $\Delta f_1$ is the increase of the current frequency or phase disturbance variation, $fI_k$ is the predetermined output current frequency at the $k^{th}$ sampling cycle, and $fV_{fk}$ is the frequency of voltage which filtered at the $K^{th}$ sampling cycle and S is the value of the error differential vector. Further, such voltage frequency change increases the predetermined current frequency, so that the voltage frequency is higher/lower than the operating range, and thus can detect the islanding operation status.

If there is no change to the voltage frequency, then the voltage frequency variation can be calculated by $fV_k - fV_{k-1} = 0 \ldots S = S_p$, S is the value of an error differential vector, and $S_p$ is the value of an error differential vector of the previous time.

Figure 4:
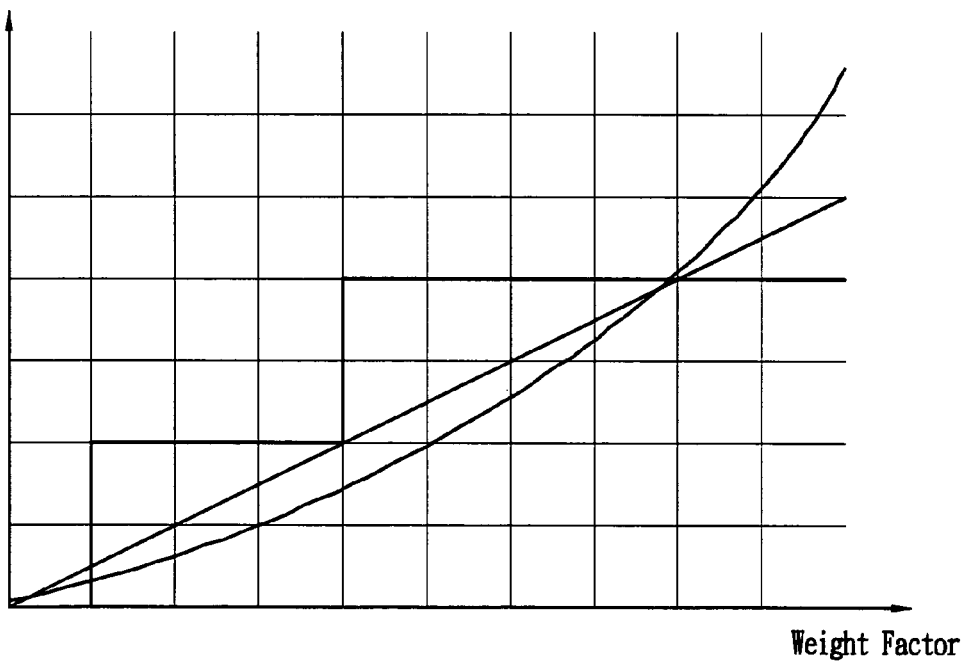
FIG. 4 is a graph of a weight function of the present invention.

To expedite the detection of an islanding operation status or avoid the incapability of detecting a variation of voltage frequency due to the load properties, a feedback weight factor $W_s$ can be designed for accumulating the number of the error differential vector. And the function of the feedback weight factor and the frequency/phase change can be a step function, a linear function, an exponential function or a polynomial function. If the value of the error differential vector unchanged, then the feedback weight factor will be incremented by 1. On the other hand, if there is a change in the value of the error differential vector, then the feedback weight factor will be reset to zero. If the error differential vector is changed, then the output frequency of current can be calculated by $fI_K = fV_{fk} + S \times F(W_s)$, where $fI_k$ is a predetermined output current frequency at the $K^{th}$ sampling cycle, $fV_k$ is a voltage frequency detected at the $K^{th}$ sampling cycle, $F(W_s)$ is a function of the feedback weight factor, and S is the value of an error differential vector $F(W_s)$ is shown in FIG. 4.

By accumulating the feedback weight factor to a predetermined value, and even if the voltage frequency still does not exceed the normal range or an islanding operation occurs, protection is assured by breaking off an islanding operation within a specified time. It also uses the feedback weight factor to adjust the current frequency or phase as shown in FIG. 4 can be a step function, a linear function, an exponential function or a polynomial function.

If a phase angle of voltage & current is adjusted when the variation of a voltage frequency is very small, then the value of phase angle can be calculated by $\Phi I_K = \Phi I_{K-1} + S \times \Delta \Phi_0$, where $\Phi I_K$ is a predetermined output phase angle at the $K^{th}$ sampling cycle, $\Phi I_{K-1}$ is a phase angle detected at the $K-1^{th}$ sampling cycle, $\Delta \Phi_1$ is a small variation of a phase angle disturbance, and S is the value of an error differential vector. However, if the voltage frequency variation is relatively large, then the value of its phase angle can be calculated by $\Phi I_K = \Phi I_{K-1} + S \times \Delta \Phi_1$, where $\Delta \Phi_1$ is an larger variation of a phase angle disturbance, $\Phi I_K$ is a predetermined output phase difference at the $K^{th}$ sampling cycle, $\Phi I_{K-1}$ is a phase angle difference detected at the $K-1^{th}$ sampling cycle, and S is the value of an error differential vector. Similarly, the weight factor $W_S$ and the phase angle change can be designed as $\Phi I_K = \Phi I_{K-1} + S \times F(W_S)$, where $\Phi I_K$ is a predetermined output phase angle difference at the $K^{th}$ sampling cycle, $\Phi I_{K-1}$ is a phase angle difference detected at the $K-1^{th}$ sampling cycle, $F(W_s)$ is a function of the weight factor and phase angle change, and S is the value of an error differential vector.

Figure 5A:
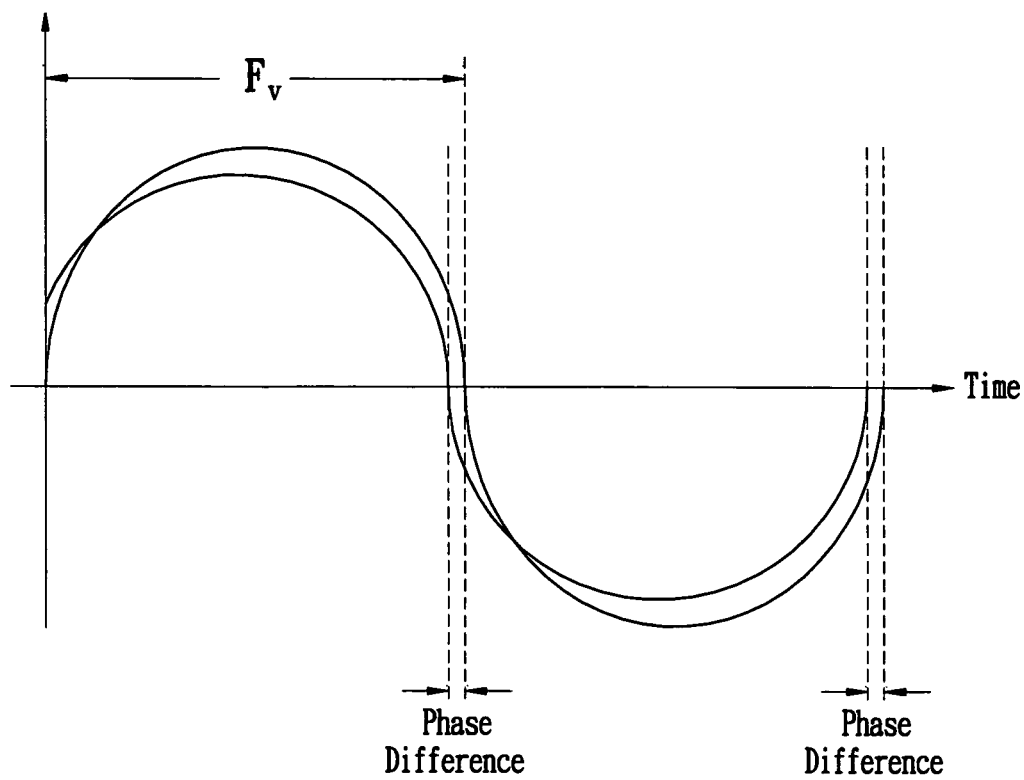
FIG. 5A is a view of detecting a half-cycle voltage frequency when the phase is changed according to the present invention.
Figure 5B:
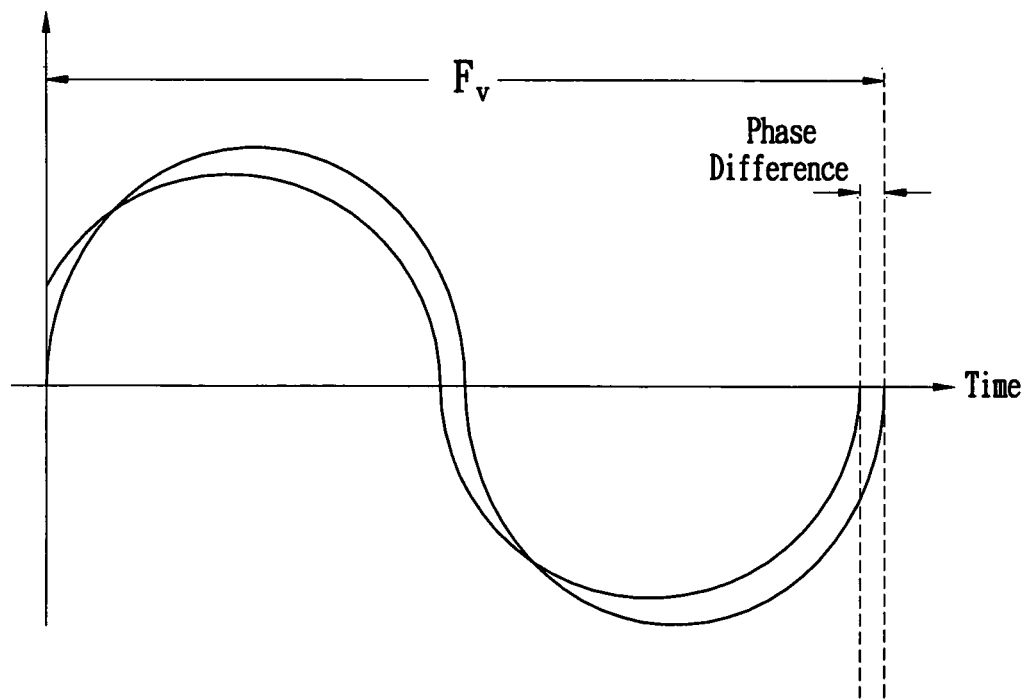
FIG. 5B is a view of detecting a full-cycle voltage frequency when the phase is changed according to the present invention.

If the polarity of the error differential vector is changed, the value of $\Phi I_{K-1}$ is cleared, which means that $\Phi I_{K-1} = 0$. The waveforms of the phase angle adjustment control method are shown in FIGS. 5A and 5B, and the voltage frequency detection can be implemented as half-cycle detection or full-cycle detection. Further, FIGS. 5A and 5B are figures that only depict the current phase lead. By the same token, it is easy for those skilled in the art to understand the waveforms of the voltage phase of a delayed current, and thus will not be described here.

While the invention has been described by means of a specification with accompanying drawings of specific embodiments, numerous modifications and variations could be made thereto by those skilled in the art without departing from the scope and spirit of the invention set forth in the claims.

What is claimed is:

1. An islanding detection method for avoiding an occurrence of an islanding condition, comprising:
   detecting a plurality of series voltage frequencies at a point of common coupling (PCC);
   obtaining a plurality of series voltage frequencies;
   comparing differences between said series voltage frequencies;
   producing an adjustment function after said comparison; and
   determining an adjustment according to said adjustment function, wherein said adjustment function is a function of an error differential vector and a feedback weight factor, the feedback weight factor being a function of accumulated error differential vectors.

2. The islanding detection method of claim 1, wherein said step of detecting a plurality of series voltage differences is achieved by using a high-resolution device.

3. The islanding detection method of claim 1, wherein said series voltage frequencies are measured by an infinite impulse response (IIR) filter.

4. An islanding detection method for avoiding an occurrence of an islanding condition, comprising:
   detecting a plurality of series voltage frequencies at a point of common coupling (PCC);
   obtaining a plurality of different series voltage frequencies;
   comparing differences between said different series voltage frequencies;
   producing an adjustment function after said comparison; and
   determining an adjustment according to said adjustment function,
   wherein said series voltage frequencies are measured by an infinite impulse response (IIR) filter, and
   wherein the step of producing an adjustment function comprises determining $fI_k = fV_{fk} + S \times \Delta f_0$, where $fI_k$ is an output current frequency at a $K^{th}$ sampling cycle, $fV_k$ is a voltage frequency detected at the $K^{th}$ sampling cycle, $\Delta f_0$ is a current frequency variation, and S is a value of an error differential vector.

5. An islanding detection method for avoiding an occurrence of an islanding condition, comprising:
   detecting a plurality of series voltage frequencies at a point of common coupling (PCC);
   obtaining a plurality of different series voltage frequencies;
   comparing differences between said different series voltage frequencies;
   producing an adjustment function after said comparison; and
   determining an adjustment according to said adjustment function,
   wherein said series voltage frequencies are measured by an infinite impulse response (IIR) filter, and
   wherein the step of producing and adjustment function comprises determining $\Phi I_K = \Phi I_{K-1} + S \times \Delta \Phi_0$, where $\Phi I_k$ is an output phase angle difference at a $K^{th}$ sampling cycle, $\Phi I_{K-1}$ is a phase angle difference detected at a $K-1^{th}$ sampling cycle, $\Delta \Phi_0$ is a current angle shift variation, and S is a value of an error differential vector.

6. The islanding detection method of claim 4, wherein said error differential vector equals 0, 1 or −1.

7. The islanding detection method of claim 6, wherein said error differential vector equals 0 if $fV_K - fV_{K-1} = 0$, where $fV_k$ is a voltage frequency detected at the $K^{th}$ sampling cycle and $fV_{k-1}$ is a voltage frequency detected at a $K-1^{th}$ sampling cycle.

8. The islanding detection method of claim 6, wherein said error differential vector equals 1 if $fV_K - fV_{K-1} > 0$, where $fV_k$ is a voltage frequency detected at the $K^{th}$ sampling cycle and $fV_{k-1}$ is a voltage frequency detected at a $K-1^{th}$ sampling cycle.

9. The islanding detection method of claim 6, wherein said error differential vector equals −1 if $fV_K - fV_{K-1} < 0$, where $fV_k$ is a voltage frequency detected at the $K^{th}$ sampling cycle and $fV_{k-1}$ is a voltage frequency detected at a $K-1^{th}$ sampling cycle.

10. An islanding detection method for avoiding an occurrence of an islanding condition, comprising:
    detecting a plurality of series voltage frequencies at a point of common coupling (PCC);
    obtaining a plurality of different series voltage frequencies;
    comparing a difference between said different series voltage frequencies;
    producing an adjustment function from said difference after said comparison; and
    determining an adjustment according to said adjustment function,
    wherein said series voltage frequencies are measured by an infinite impulse response (IIR) filter, and
    wherein the step of producing an adjustment function comprises determining $fI_k = fV_{fk} + S \times \Delta f_1$ where $\Delta f_1$ is a variation of a current frequency or a phase angle disturbance, $fI_k$ is an output current frequency at a $K^{th}$ sampling cycle, $fV_k$ is a voltage frequency detected at the $K^{th}$ sampling cycle, and S is a value of an error differential vector.

11. An islanding detection method for avoiding an occurrence of an islanding condition, comprising:
    detecting a plurality of series voltage frequencies at a point of common coupling (PCC);
    obtaining a plurality of different series voltage frequencies;
    comparing a difference between said different series voltage frequencies;
    producing an adjustment function from said difference after said comparison; and
    determining an adjustment according to said adjustment function,
    wherein said series voltage frequencies are measured by an infinite impulse response (IIR) filter, and
    wherein the step of producing an adjustment function comprises determining $\Phi I_k = \Phi I_{k-1} + S \times \Delta \Phi_1$ where $\Delta \Phi_1$ is a variation of a phase angle disturbance, $\Phi I_k$ is an output phase angle difference at a $K^{th}$ sampling cycle, $\Phi I_{k-1}$ is a phase difference detected at the $K-1^{th}$ sampling cycle, and S is value of an error differential vector.

12. The islanding detection method of claim 1, wherein said feedback weight factor function is a step function, a linear function, an exponential function, or a polynomial function.

13. The islanding detection method of claim 1, further comprising the step of incrementing said feedback weight factor by one if a value of said error differential vector remains unchanged, or resetting said feedback weight factor to zero if the value of said error differential vector component is changed.

14. The islanding detection method of claim 13, further comprising the step of calculating a current output frequency value by an equation if said error differential vector is changed, and said equation is $fI_K = fV_{fk} + S \times F(W_s)$, where $fI_k$ is a predetermined output current frequency at the $K^{th}$ sampling cycle, $fV_k$ is a voltage frequency detected at the $K^{th}$ sampling cycle, $F(W_s)$ is a function of said weight factor and said frequency change, and S is a value of an error differential vector.

15. The islanding detection method of claim 13, further comprising the step of calculating a phase angle difference by an equation if said error differential vector is changed, and said equation is $\Phi I_K = \Phi I_{K-1} + S \times F(W_S)$ where $\Phi I_K$ is a predetermined output phase angle difference output at the $K^{th}$ sampling cycle, $\Phi I_{K-1}$ is an output phase angle difference detected at the $K^{th}$ sampling cycle, $F(W_s)$ is a function of said weight factor and said phase angle change, and S is a value of an error differential vector.

\* \* \* \* \*